United States Patent
Leen et al.

(10) Patent No.: US 11,580,379 B1
(45) Date of Patent: Feb. 14, 2023

(54) PHASED DEPLOYMENT OF DEEP-LEARNING MODELS TO CUSTOMER FACING APIS

(71) Applicant: Amazon Technologies, Inc., Seattle, WA (US)

(72) Inventors: David Leen, Seattle, WA (US); Sravan Babu Bodapati, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1053 days.

(21) Appl. No.: 16/261,345

(22) Filed: Jan. 29, 2019

(51) Int. Cl.
*G06N 3/08* (2006.01)
*G06N 3/04* (2006.01)
*G06F 9/54* (2006.01)
*G06F 40/30* (2020.01)
*G06F 40/295* (2020.01)

(52) U.S. Cl.
CPC .............. *G06N 3/08* (2013.01); *G06F 9/54* (2013.01); *G06N 3/0454* (2013.01); *G06F 40/295* (2020.01); *G06F 40/30* (2020.01)

(58) Field of Classification Search
CPC .......... G06N 3/04; G06N 3/08; G06N 3/0454; G06N 20/00; G06F 9/54; G06F 40/30; G06F 40/295; G06F 16/285; G06F 16/2456
USPC .......................................................... 706/25
See application file for complete search history.

(56) References Cited

U.S. PATENT DOCUMENTS

| | | | |
|---|---|---|---|
| 10,210,861 B1* | 2/2019 | Arel | G10L 15/1815 |
| 2017/0065229 A1* | 3/2017 | Howard | A61B 5/7267 |
| 2018/0330280 A1* | 11/2018 | Erenrich | G06N 20/00 |
| 2019/0140994 A1* | 5/2019 | Snider | H04L 51/212 |
| 2019/0162868 A1* | 5/2019 | Salman | G01V 1/52 |
| 2020/0005191 A1* | 1/2020 | Ganti | G06N 20/00 |
| 2020/0027210 A1* | 1/2020 | Haemel | G06F 9/5038 |
| 2020/0133964 A1* | 4/2020 | Lee | G06F 16/355 |
| 2020/0160178 A1* | 5/2020 | Kar | G06N 3/08 |
| 2020/0167607 A1* | 5/2020 | McConachie | G06F 30/20 |
| 2020/0372414 A1* | 11/2020 | Maor | G06F 16/2456 |
| 2021/0089841 A1* | 3/2021 | Mithun | G06T 7/97 |
| 2021/0303818 A1* | 9/2021 | Randolph | G06N 3/084 |

* cited by examiner

*Primary Examiner* — James N Fiorillo
(74) *Attorney, Agent, or Firm* — Nicholson De Vos Webster & Elliott LLP.

(57) ABSTRACT

Techniques for phased deployment of machine learning models are described. Customers can call a training API to initiate model training, but then must wait while the training completes before the model can be used to perform inference. Depending on the type of model, machine learning algorithm being used for training, size of the training dataset, etc. this training process may take hours or days to complete. This leads to significant downtime where inference requests cannot be served. Embodiments improve upon existing systems by providing phased deployment of custom models. For example, a simple, less accurate model, can be provided synchronously in response to a request for a custom model. At the same time, one or more machine learning models can be trained asynchronously in the background. When the machine learning model is ready for use, the customers' traffic and jobs can be transferred over to the better model.

20 Claims, 8 Drawing Sheets

PHASED DEPLOYMENT OF DEEP-LEARNING MODELS TO CUSTOMER FACING APIS

BACKGROUND

The field of machine learning has become widely acknowledged as a likely significant driver of the future of technology. Organizations everywhere now seek to use machine learning techniques to address a wide variety of problems, such as optimizing aspects of their products, processes, customer experience, etc. While the high-level view of machine learning sounds simple—e.g., provide training data to a computer, to allow the computer to automatically learn from the training data to generate a model that can make predictions for other data—implementing machine learning techniques in practice can be tremendously difficult.

This difficulty is partially due to the underlying algorithmic and mathematical complexities of machine learning algorithms, which are typically developed by academic researchers or individuals at the forefront of the field. Additionally, it is also difficult to generate, update, and deploy useful models, which can be extremely time and resource consumptive and filled with complexities. Moreover, machine learning models tend to be focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for phased deployment of deep-learning models to customer facing application programming interfaces (APIs) are described. According to some embodiments, custom machine learning models can be provided for multiple tasks, such as topic detection, document classification, named entity recognition, object detection and classification, etc. Customers can call a training API to initiate model training, but then must wait while the training completes before the model can be used to perform inference. Depending on the type of model, machine learning algorithm being used for training, size of the training dataset, etc. this training process may take hours or days to complete. This leads to significant downtime where inference requests cannot be served. Embodiments improve upon existing systems by providing phased deployment of custom models. For example, a simple, less accurate model, can be provided synchronously in response to a request for a custom model. At the same time, one or more machine learning models can be trained asynchronously in the background. When the machine learning model is ready for use, the customers' traffic and jobs can be transferred over to the better model.

Figure 1:
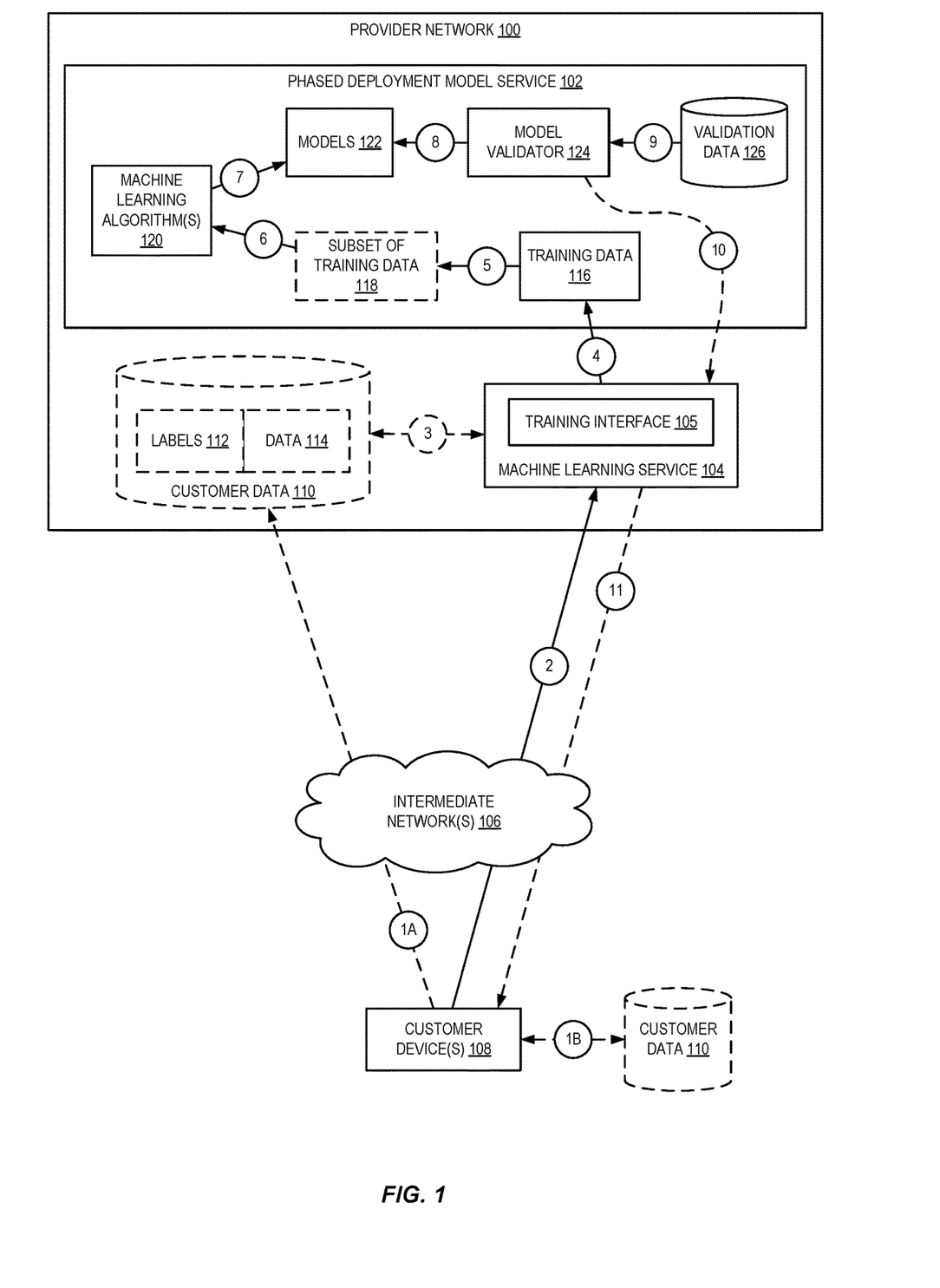
FIG. 1 is a diagram illustrating an environment for training machine learning models using a phased deployment model service according to some embodiments.

FIG. 1 is a diagram illustrating an environment for training machine learning models using a phased deployment model service according to some embodiments. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internal via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

Typically, in machine learning as a service, a model can be trained offline or in the background. The model can be tested and validated, retrained if needed, and then put in production to serve requests from customers. This is useful for generic models that can serve requests from customers in a given domain. For example, a sentiment detection model or language detection model can be used to serve requests from different customers without requiring any customer-specific training. However, for non-generic tasks a custom model needs to be trained for the customer who is using it. Such training can lead to several hours (or longer) of downtime while the model is being trained, during which customer requests cannot be served. Embodiments overcome this deficiency by training multiple models which provide different levels of accuracy which can be rolled out over time, including an initial model that can be trained and provided synchronously with the initial request.

As shown in FIG. 1, a customer device 108 can provide training data to be used to train the custom models for the customer. At numeral 1A, the training data can be stored in a storage service maintained by provider network 100. Alternatively, at numeral 1B the training data can be stored in a customer data store 110 that is maintained by the customer. At numeral 2, a request can be sent by customer device 108 to machine learning service 104. Machine learning service 104 can include a training interface 105, such as an application programming interface (API), console, application implementing a software development kit (SDK), or other interface through which training requests may be received. The request can include the training data or a reference (e.g., URI, URL, etc.) to the training data stored in a storage service. If the request includes a reference to the training data, at numeral 3, the machine learning service 104 can obtain the training data from the storage service using the reference. In some embodiments, the training data may include data 114 and associated labels 112. For example, training data to train a sentiment classifier may include text data and associated labels that indicate whether the associated data is a "positive" or "negative" sentiment. Alternatively, an image classifier may include a plurality of images and labels indicating what is shown in the images.

At numeral 4, the training data 116 can be passed to phased deployment model service 102. In some embodiments, one or more subsets of the training data can be extracted at numeral 5. For example, a model may be more quickly trained using a smaller training dataset (e.g., a small subset of the training data 116) while a more accurate model may be trained using a larger subset (or the entire dataset) but may take longer to train. At numeral 6, the subsets and/or entire training dataset can be passed to one or more machine learning algorithms. For example, an initial model may be trained quickly, such as a naive Bayes classifier, shallow neural net-based classifier, or other model. The initial model can be trained synchronously to the request, providing a custom model that can be used to serve inference requests immediately. In some embodiments, the initial request may specify a type of classifier that is to be trained (e.g., an image classifier, topic classifier, etc.).

In some embodiments, simultaneously to training the initial model, the training data can also be passed to other machine learning algorithms which can produce more accurate models, but which require longer to train. For example, as each model is trained, it can be output by the algorithms 120 to models 122 at numeral 7. Models 122 may maintain each model as it is trained or may maintain only the best available model with any earlier models deleted or archived. In some embodiments, earlier-trained models may be maintained based on the performance characteristics of later-trained models. For example, a later-trained model may produce more accurate results but may also have a higher latency (e.g., require a comparatively longer amount of time to generate an inference). However, some inference tasks may require a latency below a threshold value, which a later-trained model may not be able to meet. As such, an earlier-trained model that is of lower latency (but less accuracy) than a later-trained model may be maintained and used to respond to inference requests requiring a lower latency (e.g., synchronous inference requests requiring an immediate or near-immediate response, etc.). As noted, the initial model can be trained synchronously with the request (e.g., within minutes) and output to models 122. Subsequently, a more accurate model can be trained using a different machine learning model and the resulting model output. In some embodiments, each model can be trained using the same training dataset. Alternatively, different models can be trained using different subsets of the data. For example, the initial model may be trained using a small subset of the training dataset, while an intermediate model can be trained using a larger subset of the training dataset and a best model can be trained using the entire training dataset. As the size of the dataset used for training increases, the length of time needed to train the model may also increase. By training multiple models in parallel, increasingly accurate models can be trained and put in production without requiring downtime until the best model is trained. In some embodiments, the training dataset may be augmented using additional similar data available to the phased deployment model service or pretrained data. In some embodiments, active learning techniques may be used to train more a more accurate model. For example, data that is labeled by the model with a low confidence score can be provided to the customer to request that the customer add additional data that is similar to the low confidence data. By providing additional similar data, the training of the model can be improved.

In some embodiments, once a new model is trained, model validator can determine an accuracy of the new model at numeral 8. For example, model validator 124 may have access to a validation dataset 126 which includes known data that has been labeled by a trusted source (e.g., such that it includes ground truth labels). Model validator can process the validation data through the new model and compare the results to the ground truth labels associated with the validation data to determine the accuracy of the model. The model accuracy may be determined based on the number of correctly-labeled objects relative to a total number of labeled objects. Depending on the type of model and inference being performed, different metrics may be used to determine the accuracy of the model. Additionally, or alternatively, other metrics such as precision and recall may also be used to evaluate model performance relative to earlier-trained models. If the model accuracy is greater or equal to the accuracy of the previously produced model, then the new model can be put in production. If the new model is not as accurate as the previous model, then additional training data can be obtained to continue training the model until the accuracy improves. In some embodiments, for the first model that is generated, the model validator can ensure that the first model provides a baseline level of accuracy and thereafter, each model can be validated to ensure it provides a greater (or equal) level of accuracy to the previous model.

In some embodiments, once a model has been validated, model validator 124 can send a message at numeral 10 to machine learning service 104 to indicate that a model is available. In some embodiments, a message can be sent to customer device 108 indicating that a new model is available and/or now in use. In some embodiments, the message may include a model identifier and/or other model details.

Figure 2:
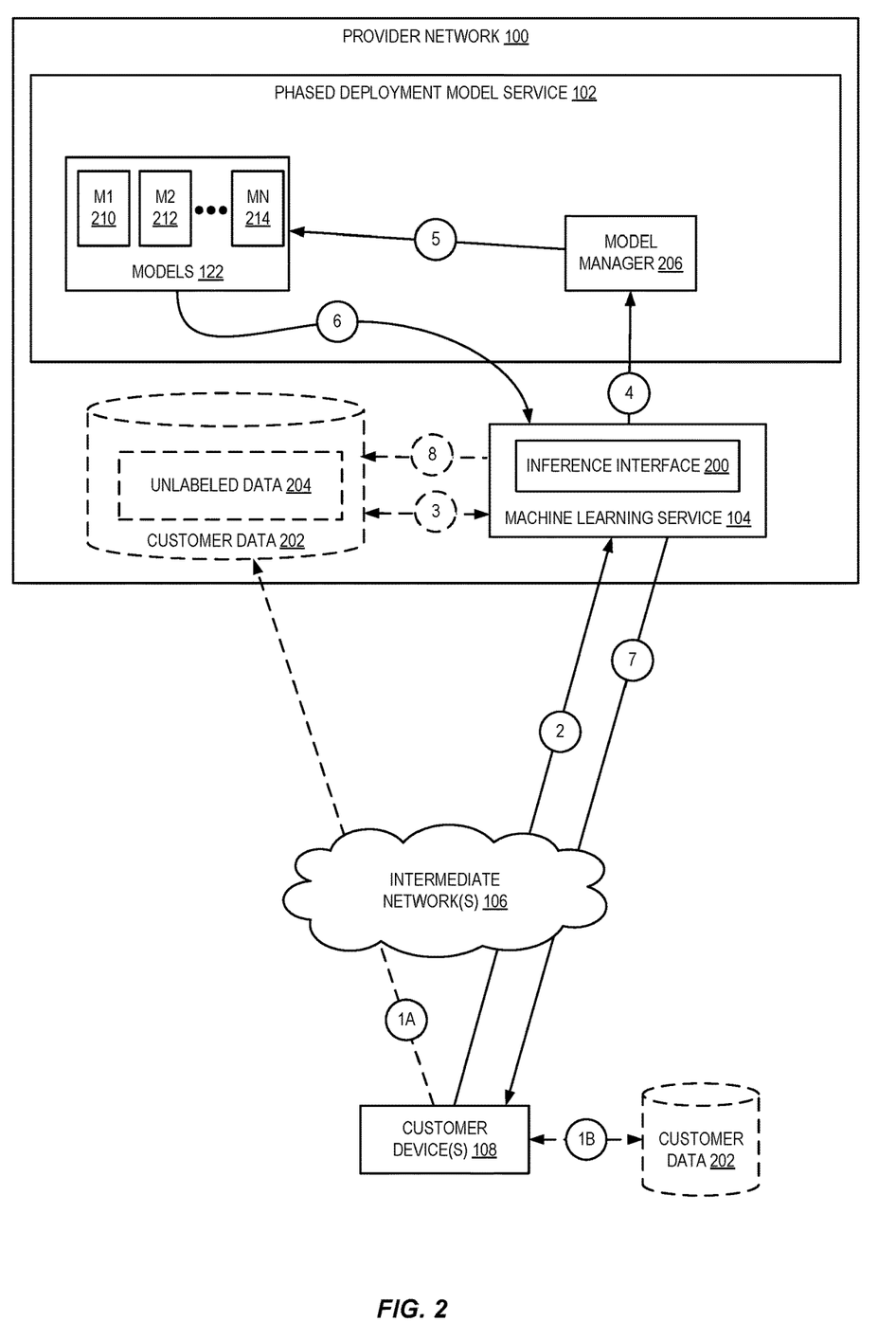
FIG. 2 is a diagram illustrating an environment for performing inference using phased deployed machine learning models according to some embodiments.

FIG. 2 is a diagram illustrating an environment for performing inference using phased deployed machine learning models according to some embodiments. As shown in FIG. 2, once a model is available, a customer can use the model to perform inference on unlabeled data. At numeral 1A, the customer can provide the unlabeled data 204 in a customer data store 202, such as a data store in a storage service in provider network 100. Alternatively, as shown at numeral 1B, the unlabeled data can be maintained in a customer data store accessible to the customer device 108. At numeral 2, the customer device can send a request to perform inference on the unlabeled data 204 to machine learning service 104. In various embodiments, machine learning service 104 may include an inference interface, such as an application programming interface (API), through which such requests may be received. In some embodiments, the request may include a reference to the unlabeled data 204 stored in a storage service or the request may include the unlabeled data. If the request includes a reference (e.g., a URL, URI, or other reference), then at numeral 3, the unlabeled data can be retrieved from the storage service.

Phased deployment service 102 can include a model manager 206 which tracks the training state of each model 122. At numeral 4, machine learning service 104 can request the best available model 122 from model manager 206. Model manager 206 can select the best model that has been trained at numeral 5 and load the best available model at numeral 6. As discussed, models 122 may include a plurality of models being trained, depicted as model M1 210, model M2 212 to model MN 214. For example, M1 may be a naive Bayes classifier or shallow neural net-based classifier which can be trained within approximately a minute. While M1 is made available synchronously with the request, models M2 to MN can be asynchronously trained in the background while M1 is used to serve inference requests. In some embodiments, model manager 206 may select a model based on its latency. When a new model is trained, its latency can be determined (e.g., using the validation dataset). This latency information can be associated with the model (e.g., as metadata). When an inference request is received, the request may be synchronous (e.g., the requestor waits for a result to be returned, such as within an HTTP response message sent in response to an HTTP request message of a particular connection) or asynchronous (e.g., where a result is returned whenever it is completed, without the requestor waiting for the response, such as via separate HTTP messages of separate connections where the initial request is sent using a first HTTP request message of a first connection and the inference result is sent using a HTTP message of a second connection). For synchronous requests, the latency of the model being used to perform inference may need to be below a latency threshold value (e.g., to ensure that a HTTP response message carrying the inference result can be returned before the connection timeouts). As such, the model manager 206 may select a model from models 122 that has an associated latency below the threshold value. This may include selecting a less accurate model to meet the latency requirements. Similarly, for an asynchronous request, the model manager may select a most accurate model without any limitation on the latency of the model. In some embodiments, the latency threshold value may be provided with the inference request from the user and the model manager may use the customer provided latency threshold value to identify a model from models 122 to serve the inference request.

In some embodiments, machine learning service 104 can pass the unlabeled data 204 to phased deployment model service 102 to be processed by the best available model. Labels for the unlabeled data can be returned in such an embodiment at numeral 6. Alternatively, after the best available model has been loaded, e.g., into memory of machine learning service 104, at numeral 6, machine learning service 104 can process the unlabeled data using the best available model. The labels can be returned at numeral 7. Alternatively, in some embodiments, the labels can be stored in customer data store 202, at numeral 8 and a reference to the labels can be returned to the customer device.

In some embodiments, multiple instance of the same model may be generated using hyperparameter optimization (HPO). Hyperparameter optimization can be used to identify constraints, weights, learning rates, etc. (e.g., hyperparameters) that more optimally solve the machine learning problem for which the model has been trained. Such optimization typically requires a search algorithm to be used to identify the hyperparameter values that improve the performance of the model, which may include training multiple models using different sets of hyperparameter values to identify a "best" set of hyperparameters resulting in a most-accurate model. Depending on how many hyperparameters are being tuned and/or the number of possible values for each hyperparameter, HPO can take a significant amount of time to complete. As such, embodiments may provide a first instance of a model in which no hyperparameters have been tuned or, if the model requires some initial tuning, then only an initial tuning has been performed. Subsequent models (e.g., model 2 212 to model N 214) can be a result of a hyperparameter search, with each model 2-N having more hyperparameters tuned, "better" hyperparameter values, and/or combinations of values identified, which requires longer training.

In some embodiments, model manager 206 can monitor models 122 to determine which model 122 is the best available model. For example, in some embodiments, once a new model has been validated by model validator 124 a notification can be sent to model manager 206 including an identifier associated with the newly trained model. As new models become available, request traffic can be seamlessly transitioned to use the new models. In some embodiments, traffic can be gradually transitioned to the new models. For example, requests may be randomly redirected to the new models or requests may be alternated between the old model and the new model. In some embodiments, when a new model is trained and validated, the older models can be deleted or archived such that they are not available to serve new requests. In some embodiments, the request may include an identifier associated with one of the models to be used to perform inference.

Figure 3:
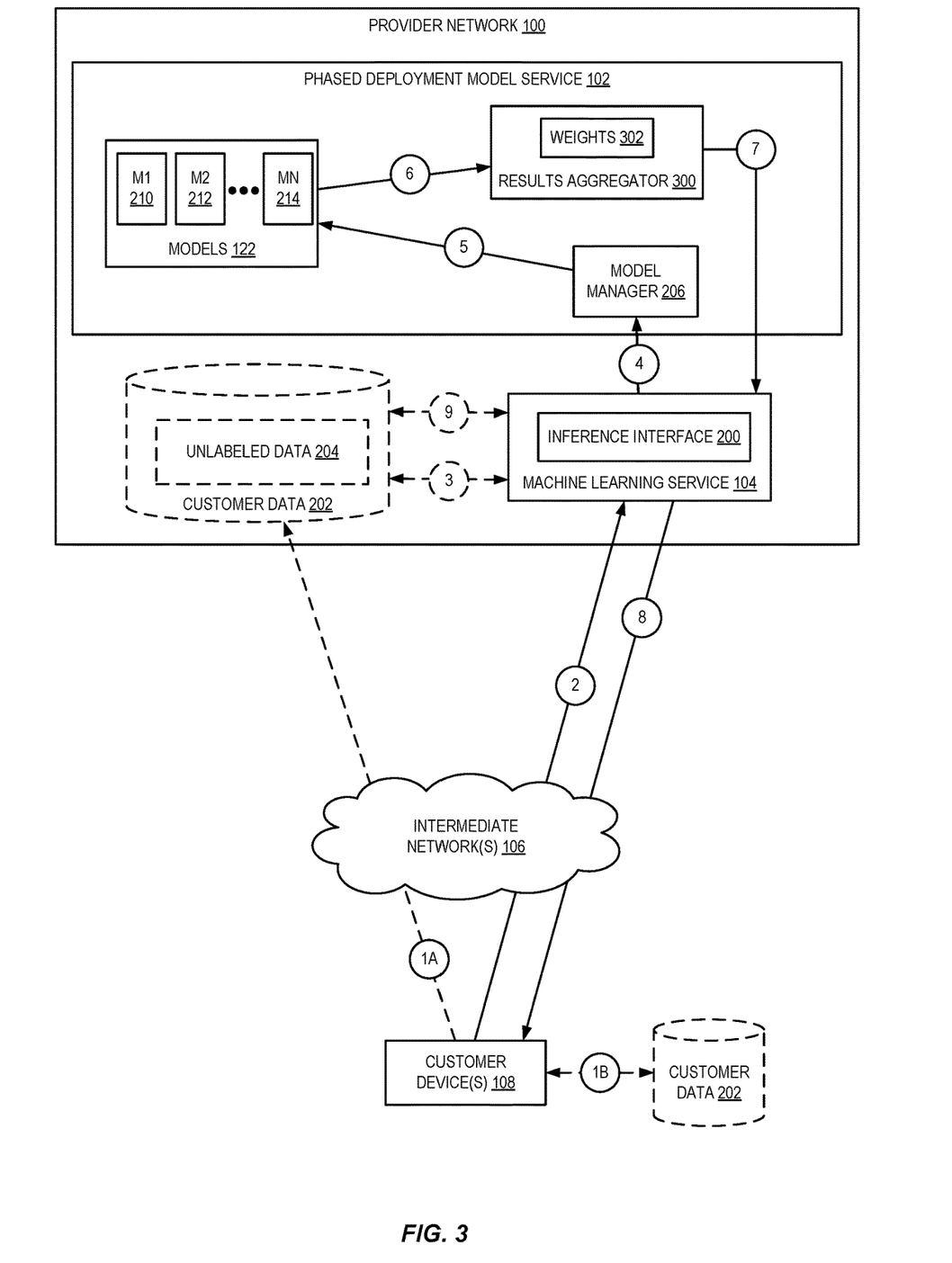
FIG. 3 is a diagram illustrating an alternative environment for performing inference using phased deployed machine learning models according to some embodiments.

FIG. 3 is a diagram illustrating an alternative environment for performing inference using phased deployed machine learning models according to some embodiments. As discussed, in some embodiments, when a new model is available, traffic can be transitioned to use the new model to perform inference. In some embodiments, this transition can include processing unlabeled data by multiple models and aggregating the results. As discussed with respect to FIG. 2, a new request can be received by machine learning service 104 through inference interface 200. The request can include the unlabeled data to be labeled or a reference to the unlabeled data. The machine learning service 104 can obtain the unlabeled data from a storage service using the reference (if one was included in the request). At numeral 4, the unlabeled data can be passed to model manager 206. Model manager 206 can determine which models 122 have been trained and, at numeral 5, can pass the unlabeled data to the models to be processed. Each model can output an inference for each piece of data of the unlabeled dataset, depending on what the model has been trained for. For example, if the models are trained for object detection, each model may output a bounding box and confidence score, if the models are trained to perform topic detection, the models may output one or more topics and corresponding confidence scores for the topics. As discussed various models may be trained to perform various inference tasks.

The outputs of each models can be passed at numeral 6 to results aggregator 300. Results aggregator 300 may include weights 302 associated with each model 122. Results aggregator can calculate a weighted average of the outputs of each model, with the weighted average result returned at numeral 7. In some embodiments, the weights can be learned for each model based, e.g., on the validation results for each model. For example, a model determined to provide more accurate results based on validation, may be associated with a higher weight while lower accuracy models may be associated with lower weights. In some embodiments, some models may be determined to be better at classifying some types of data and data received of that type may be sent to that model, while other types of data may be sent to the best available model for processing. The ensemble result based on the outputs of the available models can be returned at numeral 8 to the customer device. In some embodiments, the results can be stored at numeral 9 to customer data store 202 in a storage service, and a reference to those results can be returned to the customer device.

Figure 4:
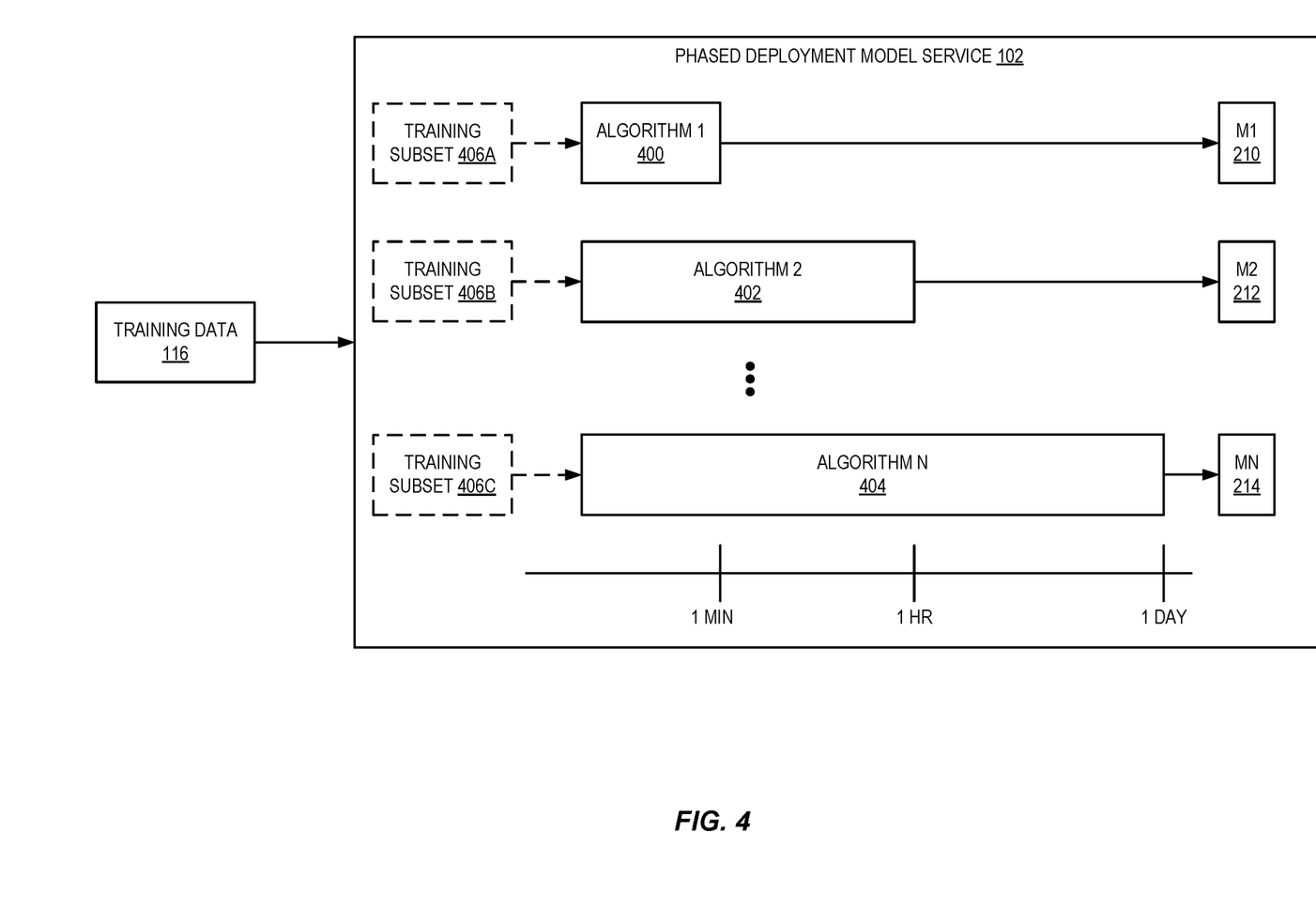
FIG. 4 is a diagram illustrating an environment for training machine learning models in parallel over time according to some embodiments.

FIG. 4 is a diagram illustrating an environment for training machine learning models in parallel over time according to some embodiments. As discussed, phased deployment model 102 can include multiple models: a first model M1 210 that is returned synchronously with the request to train a model received from a customer. When a request is received and training data 116 is obtained, the training data can be used to train the first model M1 quickly. As shown, M1 can be trained within approximately a minute. In some embodiments, each model can be trained using a different machine learning algorithm 400-404. For example, M1 can be a classifier that is quickly trained as a naive Bayes classifier, while M2 or MN can be a deep learning-based classifier, where the algorithm is a neural network or other deep learning algorithm, a K-nearest neighbors algorithm, or other machine learning algorithm which takes longer (e.g., hours or days) to train. The specific algorithm in use may be selected based on the estimated training time required, allowing multiple models to be trained over time in the background. Additionally, or alternatively, portions of the training data 406A-406C may be used with the algorithms 400-404 to train each model. For example, a first training subset 406A may be extracted from the training data and used to train M1 210. This may be a smaller dataset than training subset 406B or 406C, as a smaller training dataset may be able to train a model more quickly than a larger training subset (or the entire training dataset). In some embodiments, each algorithm in use 400-404 may be the same algorithm, and the size of the training subset 406A-406C is varied to result in different training times. In some embodiments, each training subset 406A-406C may represent a different sampling of the training dataset. As such, the size of each training subset may be the same, but each training subset may represent a different selection of training data from the training dataset.

Figure 5:
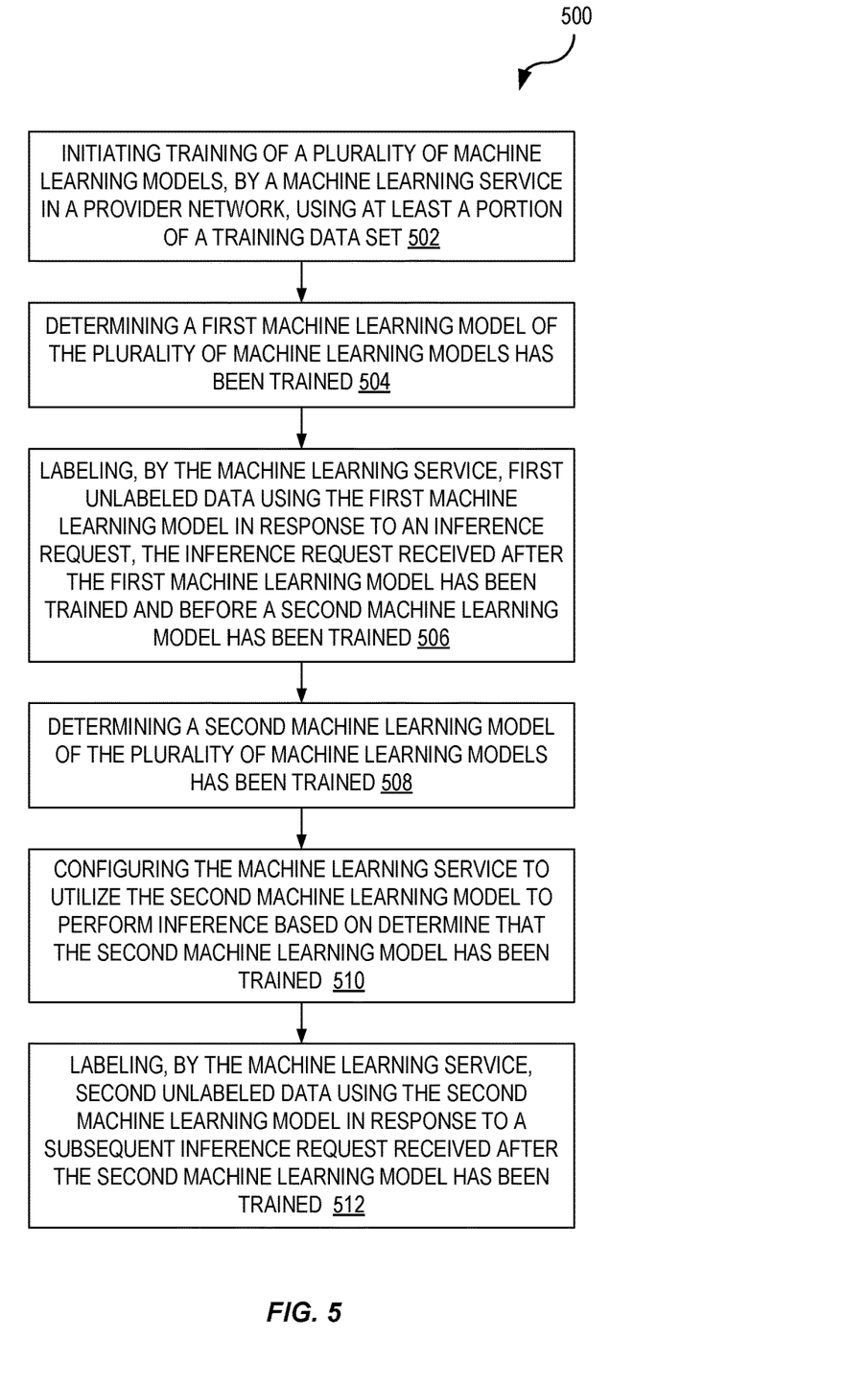
FIG. 5 is a flow diagram illustrating operations of a method for phased deployment of machine learning models according to some embodiments.

FIG. 5 is a flow diagram illustrating operations 500 of a method for phased deployment of deep-learning models to customer facing APIs according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by phased deployment service 102 and/or machine learning service 104 of the other figures.

The operations 500 include, at block 502, initiating training of a plurality of machine learning models, by a machine learning service in a provider network, using at least a portion of a training dataset. In some embodiments, each machine learning model is trained using a different machine learning algorithm. In some embodiments, each machine learning model is trained using a different portion of the training dataset. In some embodiments, each machine learning model is trained over a different time period. In some embodiments, each machine learning model is trained using a same machine learning algorithm and each machine learning model is configured with a different one or more hyperparameter values The operations 500 include, at block 504, determining a first machine learning model of the plurality of machine learning models has been trained. The operations 500 include, at block 506, labeling, by the machine learning service, first unlabeled data using the first machine learning model for an inference request, the inference request received after the first machine learning model has been trained and before a second machine learning model has been trained. In some embodiments, a request can be received to train a machine learning model, the request including a reference to the training dataset stored in a storage service accessible using the reference.

The operations 500 include, at block 508, determining the second machine learning model of the plurality of machine learning models has been trained. In some embodiments, determining a second machine learning model has been trained can include determining an accuracy of the second machine learning model using a validation dataset and determining the accuracy of the second machine learning model is greater than a threshold value.

The operations 500 include, at block 510, configuring the machine learning service to utilize the second machine learning model to perform inference based on determining that the second machine learning model has been trained. The operations 500 include, at block 512, labeling second unlabeled data using the second machine learning model for a subsequent inference request received after the second machine learning model has been trained. In some embodiments, labeling, by the machine learning service, second unlabeled data using the second machine learning model for a subsequent inference request can include obtaining labels for the unlabeled data from the first machine learning model and the second machine learning model, and aggregating the labels for the second unlabeled data using first weights associated with the first machine learning model and second weights associated with the second machine learning model wherein the first machine learning algorithm and the second machine learning model are different machine learning algorithms.

In some embodiments, the operations may further include sending a message indicating that the subsequent inference requests are being served using the second machine learning model. In some embodiments, the operations may further include determining a latency of the second machine learning model is less than or equal to a latency of the first machine learning model, and deleting the first machine learning model after the second machine learning model has been trained.

In some embodiments the operations 500 may include, receiving a request to train a machine learning model, the request including a reference to a training dataset, obtaining the training dataset using the reference, initiating training of a plurality of machine learning models using the training dataset, each machine learning model trained using a different machine learning algorithms, determining a first machine learning model has been trained, sending a message indicating that the first machine learning model has been trained, receiving a first request to label a first unlabeled dataset, the first request including a reference to a first unlabeled dataset, the first request received after the first machine learning model has been trained and before a second machine learning model has been trained, labeling the first unlabeled dataset using the first machine learning model, determining the second machine learning model has been trained, receiving a second request to label a second unlabeled dataset, the second request including a reference to a second unlabeled dataset, the second request received after the second machine learning model has been trained, and labeling the second unlabeled dataset using the second machine learning model.

Figure 6:
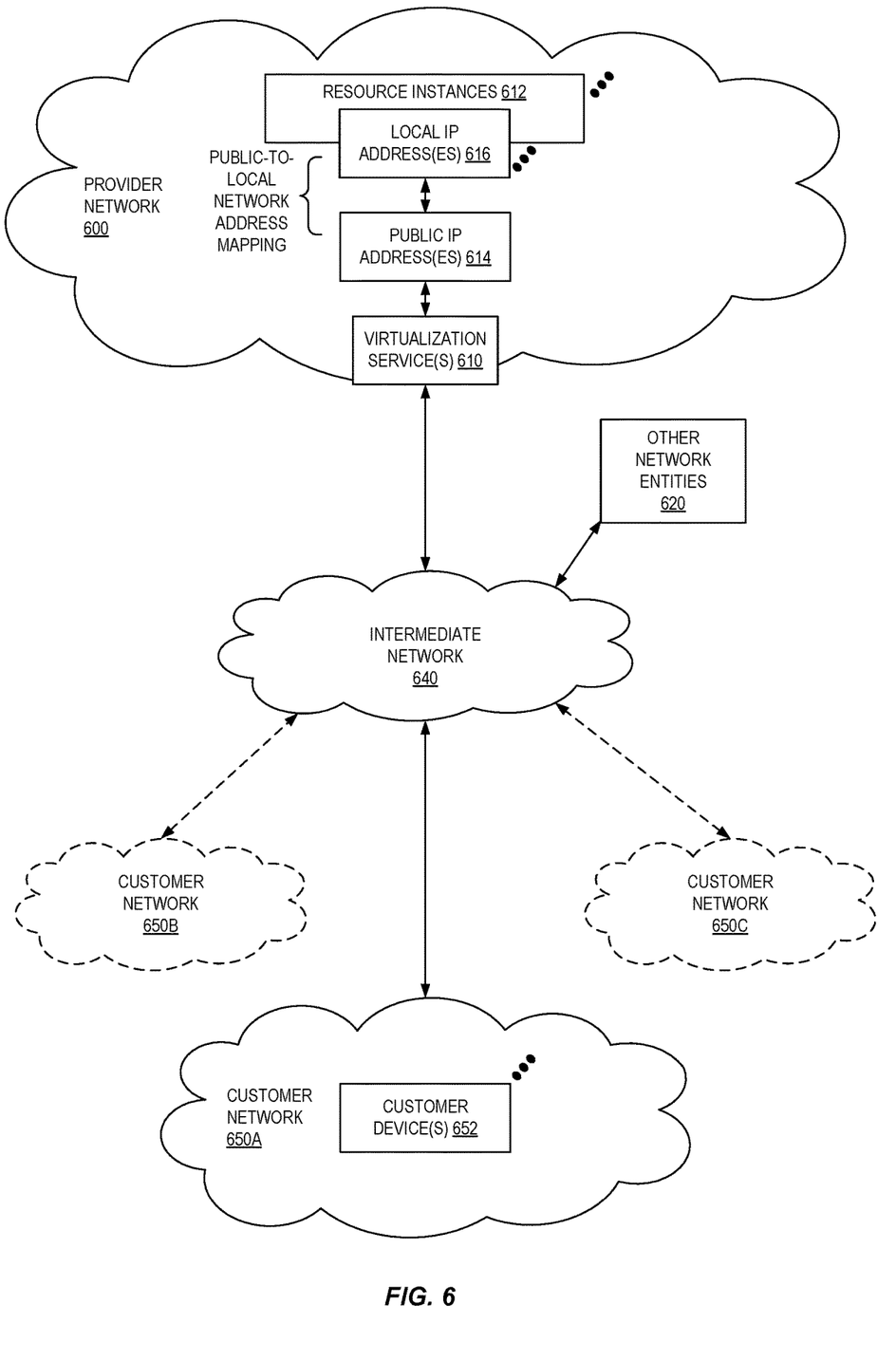
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
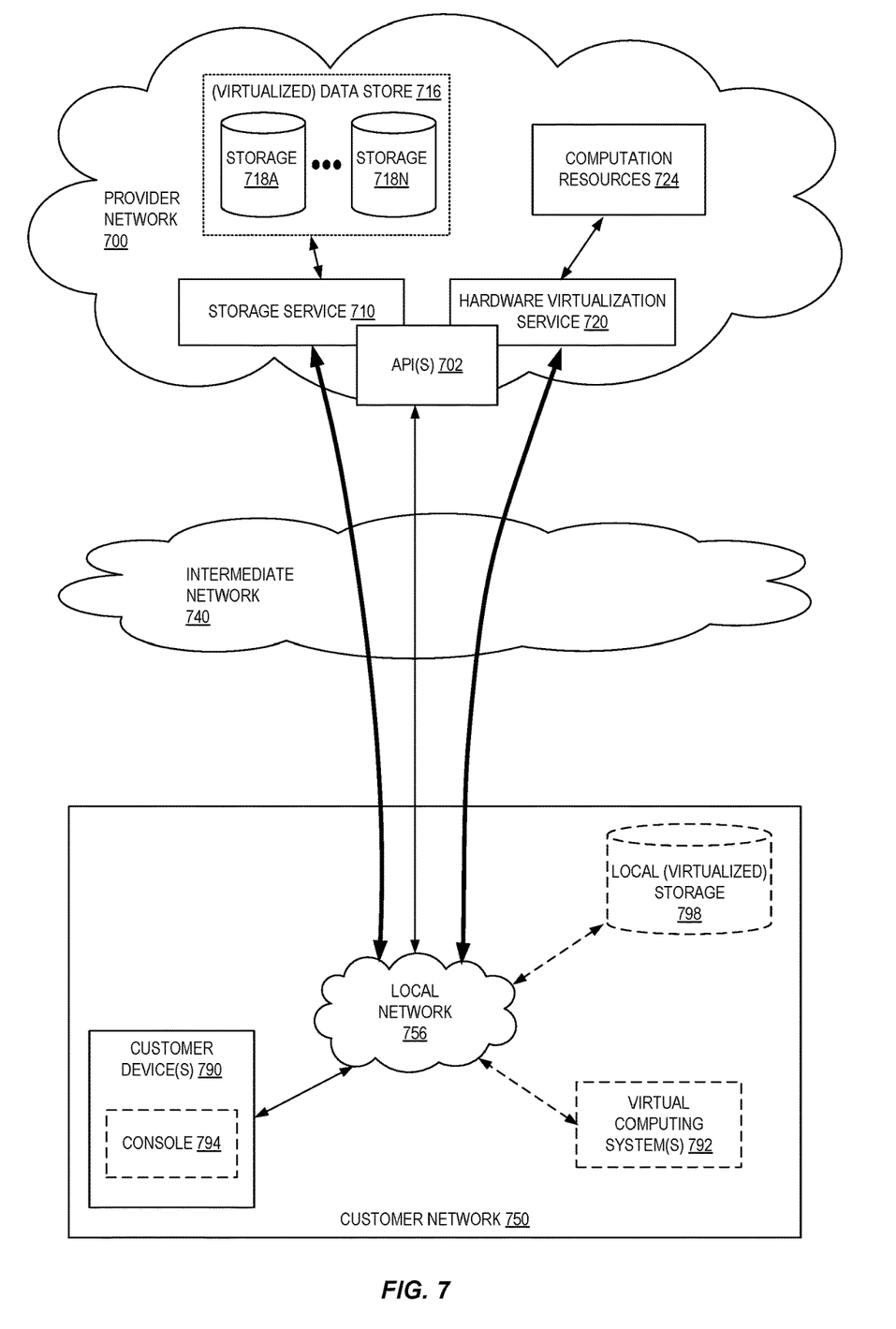
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative System

Figure 8:
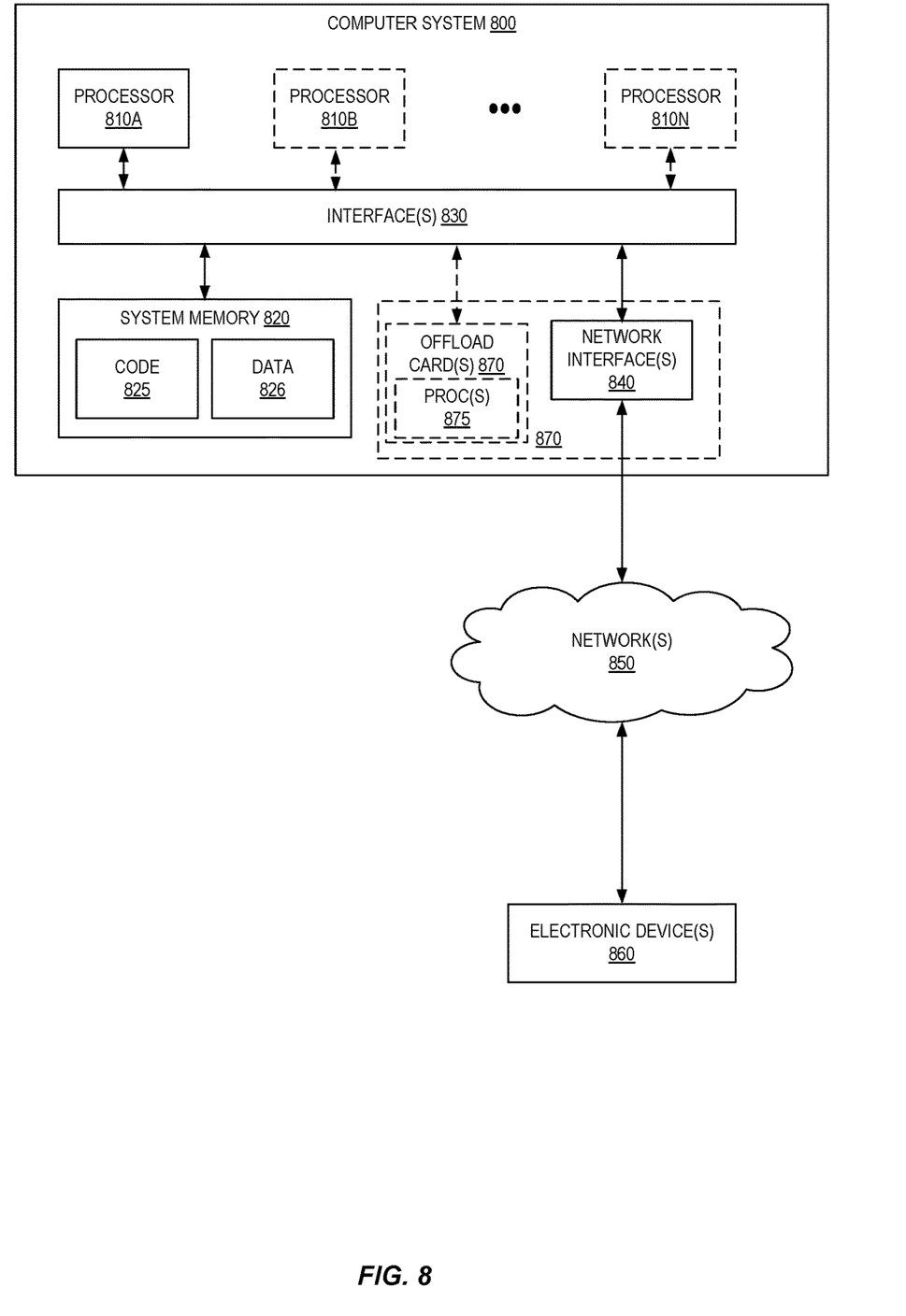
FIG. 8 is a block diagram illustrating an example computer system that may be used in some embodiments.

In some embodiments, a system that implements a portion or all of the techniques for phased deployment of deep-learning models to customer facing APIs as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 406A-406C, 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a request to train a machine learning model, the request including a reference to a training dataset;
obtaining the training dataset using the reference;
initiating simultaneous training of a plurality of machine learning models using the training dataset, each machine learning model trained using a different machine learning algorithm;
determining a first machine learning model of the plurality of machine learning models has been trained;
sending a message indicating that the first machine learning model has been trained;
receiving, by a service of a provider network, a first request to label a first unlabeled dataset, the first request including a reference to the first unlabeled dataset;
labeling, by the service, the first unlabeled dataset using the first machine learning model;
while labeling the first unlabeled dataset using the first machine learning model, continuing to train a second machine learning model of the plurality of machine learning models, wherein the first machine learning model is trained using a first subset of the training dataset and the second machine learning model is trained using a second subset of the training dataset, wherein the second subset is larger than the first subset;
determining the second machine learning model has been trained;
configuring the service to utilize the second machine learning model to perform labeling based on determining that the second machine learning model has been trained;

receiving, by the service, a second request to label a second unlabeled dataset, the second request including a reference to the second unlabeled dataset; and labeling, by the service, the second unlabeled dataset using the second machine learning model.

2. The computer-implemented method of claim 1, wherein determining the second machine learning model has been trained further comprises:

determining an accuracy of the second machine learning model using a validation dataset; and determining the accuracy of the second machine learning model is greater than a threshold value.

3. The computer-implemented method of claim 1, wherein labeling the second unlabeled dataset using the second machine learning model comprises:

obtaining labels for the second unlabeled dataset from the first machine learning model and the second machine learning model; and aggregating the labels for the second unlabeled dataset using first weights associated with the first machine learning model and second weights associated with the second machine learning model.

4. A computer-implemented method comprising:

initiating simultaneous training of a plurality of machine learning models, by a machine learning service in a provider network, using at least a portion of a training dataset;

determining a first machine learning model of the plurality of machine learning models has been trained;

labeling, by the machine learning service, first unlabeled data using the first machine learning model for an inference request, the inference request received after the first machine learning model has been trained and before a second machine learning model has been trained;

while labeling the first unlabeled data using the first machine learning model, continuing to train a second machine learning model of the plurality of machine learning models, wherein the first machine learning model is trained using a first subset of the training dataset and the second machine learning model is trained using a second subset of the training dataset, wherein the second subset is larger than the first subset;

determining the second machine learning model of the plurality of machine learning models has been trained;

configuring the machine learning service to utilize the second machine learning model to perform inference based on determining that the second machine learning model has been trained; and labeling, by the machine learning service, second unlabeled data using the second machine learning model for a subsequent inference request received after the second machine learning model has been trained.

5. The computer-implemented method of claim 4, wherein each machine learning model is trained using a different machine learning algorithm.

6. The computer-implemented method of claim 4, wherein each machine learning model is trained using a different portion of the training dataset.

7. The computer-implemented method of claim 4, wherein each machine learning model is trained using a same machine learning algorithm and wherein each machine learning model is configured with a different one or more hyperparameter values.

8. The computer-implemented method of claim 4, wherein determining a second machine learning model has been trained further comprises:

determining an accuracy of the second machine learning model using a validation dataset; and determining the accuracy of the second machine learning model is greater than a threshold value.

9. The computer-implemented method of claim 4, wherein labeling the second unlabeled data using the second machine learning model for a subsequent inference request further comprises:

obtaining labels for the second unlabeled data from the first machine learning model and the second machine learning model; and aggregating the labels for the second unlabeled data using first weights associated with the first machine learning model and second weights associated with the second machine learning model wherein the first machine learning model and the second machine learning model are based on different machine learning algorithms.

10. The computer-implemented method of claim 4, further comprising:

sending a message indicating that the subsequent inference request is being served using the second machine learning model.

11. The computer-implemented method of claim 4, further comprising:

determining a latency of the second machine learning model is less than or equal to a latency of the first machine learning model; and deleting the first machine learning model after the second machine learning model has been trained.

12. The computer-implemented method of claim 4, wherein the plurality of machine learning models provide different levels of accuracy and can be rolled out over time, including the first machine learning model that can be trained and provided synchronously with an initial request to train a machine learning model.

13. A system comprising:

a machine learning service implemented by a first one or more electronic devices; and a phased deployment model service implemented by a second one or more electronic devices, the phased deployment model service including instructions that upon execution cause the phased deployment model service to:

initiate simultaneous training of a plurality of machine learning models using at least a portion of a training dataset;

determine a first machine learning model of the plurality of machine learning models has been trained;

cause the machine learning service to label first unlabeled data using the first machine learning model for an inference request, the inference request received after the first machine learning model has been trained and before a second machine learning model has been trained;

while labeling the first unlabeled data using the first machine learning model, continue to train a second machine learning model of the plurality of machine learning models, wherein the first machine learning model is trained using a first subset of the training dataset and the second machine learning model is trained using a second subset of the training dataset, wherein the second subset is larger than the first subset;

determine the second machine learning model of the plurality of machine learning models has been trained;

configure the machine learning service to utilize the second machine learning model to perform inference based on determining that the second machine learning model has been trained; and cause the machine learning service to label second unlabeled data using the second machine learning model for a subsequent inference request received after the second machine learning model has been trained.

14. The system of claim 13, wherein each machine learning model is trained using a different machine learning algorithm.

15. The system of claim 13, wherein each machine learning model is trained using a different portion of the training dataset.

16. The system of claim 13, wherein each machine learning model is trained using a same machine learning algorithm and wherein each machine learning model is configured with a different one or more hyperparameter values.

17. The system of claim 13, wherein to determine a second machine learning model has been trained, the instructions, when executed, further cause the phased deployment model service to:

determine an accuracy of the second machine learning model using a validation dataset; and determine the accuracy of the second machine learning model is greater than a threshold value.

18. The system of claim 13, wherein to label the second unlabeled data using the second machine learning model for a subsequent inference request, the instructions, when executed, further cause the phased deployment model service to:

obtain labels for the second unlabeled data from the first machine learning model and the second machine learning model; and aggregate the labels for the second unlabeled data using first weights associated with the first machine learning model and second weights associated with the second machine learning model wherein the first machine learning model and the second machine learning model are based on different machine learning algorithms.

19. The system of claim 13, wherein the instructions, when executed, further cause the phased deployment model service to:

send a message indicating that the subsequent inference request is being served using the second machine learning model.

20. The system of claim 13, wherein the instructions, when executed, further cause the phased deployment model service to:

determine a latency of the second machine learning model is less than or equal to a latency of the first machine learning model; and delete the first machine learning model after the second machine learning model has been trained.

* * * * *